Aug. 22, 1967  H. L. CHAMBERS  3,336,764

FLEXIBLE COUPLING

Filed Sept. 13, 1965

INVENTOR.
HOWARD L. CHAMBERS
BY
ATTY.

United States Patent Office 3,336,764
Patented Aug. 22, 1967

3,336,764
FLEXIBLE COUPLING
Howard L. Chambers, Herkimer, N.Y., assignor to The Bendix Corporation, a corporation of Delaware
Filed Sept. 13, 1965, Ser. No. 486,984
4 Claims. (Cl. 64—13)

ABSTRACT OF THE DISCLOSURE

A flexible coupling having spaced annular metallic diaphragms interconnected by a rigid torque tube. The torque tube is split axially into two generally-half cylindrical segments. The diaphragms are arranged to be connected to power shafts by attachment collars connected to their inner diameters. The collars are preferably arranged within the torque tube since the split configuration permits access for attachment. The arrangement permits maximum diaphragm spacing to accommodate maximum misalignment. The connecting torque tube may be made from sheet metal stampings and a number of diameters may be formed for greater rigidity.

---

An object of the present invention is to provide an improved, low cost universal drive shaft to transmit torque between shafts having fixed or varying misalignment at high speeds.

Another object of the present invention is to provide a novel flexible coupling having a split torque tube design which permits easy and speedy installation of the flexible coupling on the shafts to be connected which will accommodate greater shaft misalignments than prior devices of a comparable class.

A further object of the present invention is to provide a contoured torque tube for use in a flexible coupling which provides additional rigidity to the flexible coupling.

A still further object of the present invention is to provide a flexible coupling which can interconnect shafts with varying axial separation.

A still further object of the present invention is to provide a novel flexible coupling which has low cost guard members so that no non-uniform rotating surfaces are exposed, thereby eliminating risk of injury to those operating with or assembling flexible couplings.

The accomplishment of the above and other objects along with the features and advantages of the invention will be apparent from the consideration of the following description taken in connection with the accompanying drawings wherein embodiments of the invention are illustrated by way of example:

Figure 1:
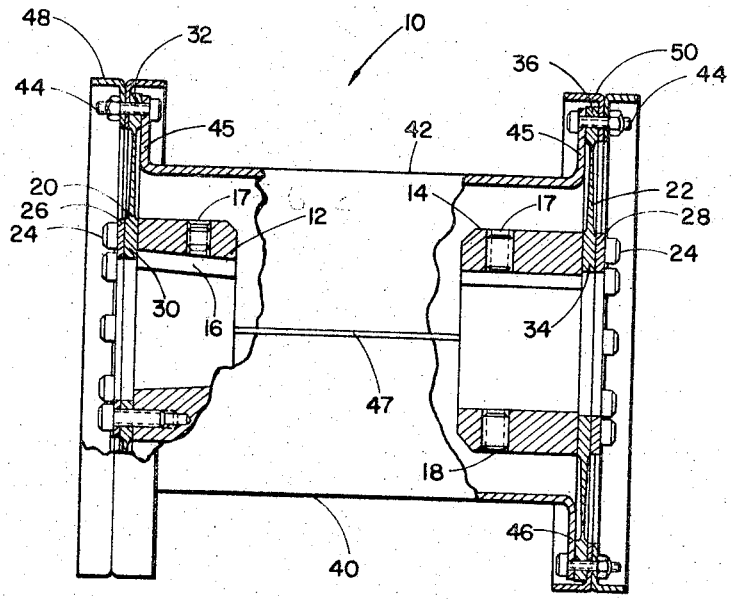
FIGURE 1 is a longitudinal view, partly broken away and partly in section, of a flexible coupling being a first embodiment of the present invention.

Turning now to FIGURE 1, a flexible coupling, shown generally by the numeral 10, has first and second drive collars 12 and 14 having an axially-extending keyway 16 and a threaded member 17 to secure the key in the shaft to the keyway. A threaded member 18 is also provided to engage the shaft to be connected. The drive collars 12 and 14 are completely reversible and either one may be the driving collar and the other would be the driven collar. Connected to the respective drive collar members are first and second annular contoured diaphragm members 20 and 22 which are connected to the drive shafts 12 and 14 by a plurality of inner bolts 24 through annular stiffening ring members 26 and 28. The diaphragm members themselves each having respectively inner and outer annular stiffening rings 30, 32 and 34 and 36.

Interconnecting the axially-extending diaphragms are first and second axially-extending, substantially-rigid torque tube members 40 and 42 which are connected to the diaphragm members by a plurality of outer bolts 44. The torque tube members may be either substantially semi-cylindrical or arcuate in shape. When assembled in a flexible coupling, there is an axially-extending space 47 between the tube members. Each tube member has flanged transverse ends 45 and 46 which are connected to the outer edge of the diaphragm members. The flanges may be turned radially inwardly, rather than radially outwardly as shown.

A plurality or pairs of first and second annular guard ring members 48 and 50 are also held in position by the plurality of outer bolts 44. The use of guard members is optional. However, the guard members prevent the exposure of any non-uniform rotating surfaces which keep noise level down and provide additional safety for those working on or near the rotating shafts which are interconnected.

Figure 2:
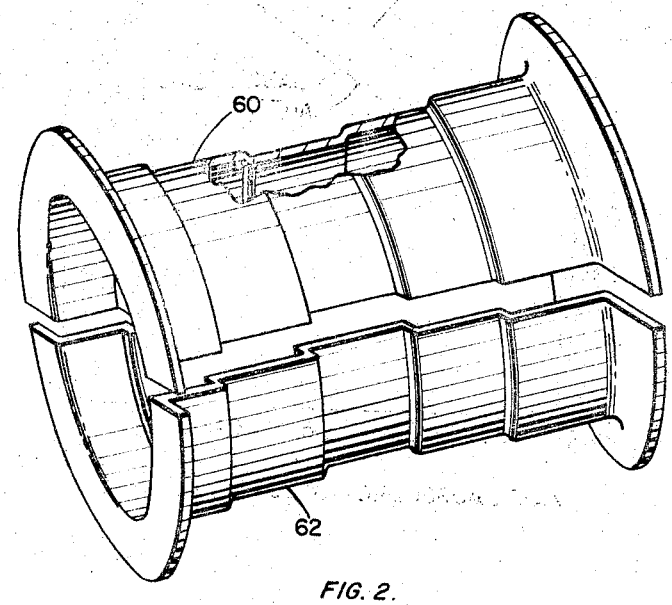
FIG. 2 is a perspective view of a second embodiment of the split torque tube for a flexible coupling.

FIGURE 2 shows a second embodiment of the rigid torque tube members, The torque tube members, shown in FIGURE 2, are a pair of stepped or variable diameter tube members 60 and 62. The stepped or ribbed tubes 60 and 62 provide additional axial rigidity and torque handling capability not provided by the plain or straight tube of the same thickness and diameter and length. The stepped tube members 60 and 62 are at each diameter either substantially semicylindrical or arcuate in shape. Further, there are essentially no sharp circumferential discontinuities in the stepped tube members 60 and 62.

It can be readily be appreciated that the present invention accomplishes its stated objects. The torque tubes may be stamped rather than machined as formerly done, as essential cost saving feature. The guard members may be made of stampings, an additional cost saving feature. Assembly of the tubes on shafts to be connected is far simpler than in former designs. With the present invention, the drive collars 12 and 14 with the diaphragm members already assembled are placed on the shafts to be interconnected. One of the split rigid torque tube members would then be interconnected between the drive collars. Their axial dimension having been fixed, the collars would then be firmly connected to the driving members to be interconnected and then the second split tube added and the assembly is completed. Thus, it is not necessary to move the units to be interconnected. Field replacement is, therefore, quite simple. Locating the collar members 12 and 14 radially inwardly of the split torque tube members 40 and 42 permits the coupling to accommodate maximum parallel misalignment for a given flexible coupling length. Effective maximum misalignment capabilities can only be achieved if the diaphragm members can be assembled without any significant axial separation pre-stresses. The axial separation pre-stresses can, in turn, only be avoided by the use of axially split tube members which are assembled on the shafts to be connected in the manner described above.

Further, flexible coupling parts are fully interchangeable considering the split torque tube as a unit. In prior art couplings, a part failure required replacement of the entire unit or major subassemblies. A further advantage of the present invention over the prior art is its light weight. The stamped members are far lighter than the heavy machined members formerly used. Additionally, the diaphragm members 20 and 22 may have their inner and outer surfaces coated to protect the diaphragms from nicking and scratching.

In summation, the present invention is less expensive to manufacture and assemble than former units. The present invention is lighter in weight and greater in operational capability than prior art devices of equivalent capacity. It is more versatile and safer in use than prior art devices and it is more readily installed on shafts to be coupled than prior art units. The present invention can accommodate greater shaft misalignments and can eliminate diaphragm pre-stresses.

Although specific embodiments of the present invention have been shown and described, it is apparent that various changes may be made by persons skilled in the art without departing from the scope and spirit of the invention as defined in the following claims.

I claim:
1. In a flexible coupling for two shafts the combination of:
   a driving collar member having connecting means;
   a driven collar having connecting means;
   a pair of flexible annular diaphragm means fixedly connected to the driving and driven collars respectively;
   an axially-split, substantially-rigid torque transmission tube fixedly connected to each of said pair of diaphragm means to provide a torque transmitting interconnection therebetween; and
   said axially-split torque tube arranged to enclose said driving and driven collars and having a plurality of diameters to thereby stiffen said tube.

2. In a flexible coupling as claimed in claim 1 wherein:
   said torque tube has flanged transverse ends adapted for being fixedly connected to said diaphragm members.
3. In a flexible coupling as claimed in claim 1 including:
   a plurality of annular guard members connected for rotation with the flexible diaphragm members.
4. In a flexible coupling as claimed in claim 3 wherein:
   said axially-split torque tube is a stamping; and
   said annular guard members are stampings having a flange formed thereon.

References Cited

UNITED STATES PATENTS

| | | | |
|---|---|---|---|
| 2,667,768 | 2/1954 | Winkler et al. | 64—11 |
| 2,821,071 | 1/1958 | Tetlow | 64—15 |
| 2,997,863 | 8/1961 | Stone et al. | 64—13 |
| 3,095,714 | 7/1963 | Schlotmann | 64—11 |
| 3,124,942 | 3/1964 | Rothfuss et al. | 64—13 |
| 3,233,428 | 2/1966 | Chalpin | 64—15 |

FOREIGN PATENTS 201,670   8/1923   Great Britain.

FRED C. MATTERN, Jr., *Primary Examiner.*

HALL C. COE, *Examiner.*